United States Patent
Lang et al.

(10) Patent No.: US 10,363,543 B2
(45) Date of Patent: Jul. 30, 2019

(54) GAS DRIVEN FLUID TRANSPORT

(71) Applicant: General Electric Company, Schenectady, NY (US)

(72) Inventors: Philipp Lang, Munich (DE); Ruben Julian Salvamoser, Munich (DE); Victor Donald Samper, Kirchseeon (DE); Christian Friedrich Peter Rensch, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 140 days.

(21) Appl. No.: 15/132,751

(22) Filed: Apr. 19, 2016

(65) Prior Publication Data

US 2017/0297017 A1 Oct. 19, 2017

(51) Int. Cl.
| | | |
|---|---|---|
| *G01F 11/00* | (2006.01) | |
| *B01J 19/24* | (2006.01) | |
| *G01F 11/28* | (2006.01) | |
| *B01J 19/00* | (2006.01) | |
| *B67D 7/02* | (2010.01) | |
| *G01F 13/00* | (2006.01) | |

(52) U.S. Cl.
CPC ........... *B01J 19/24* (2013.01); *B01J 19/0093* (2013.01); *G01F 11/28* (2013.01); *B01J 2219/009* (2013.01); *B01J 2219/00783* (2013.01); *B01J 2219/00792* (2013.01); *B01J 2219/00795* (2013.01); *B01J 2219/00858* (2013.01); *B01J 2219/00891* (2013.01); *B01J 2219/00963* (2013.01); *B67D 7/0266* (2013.01); *G01F 13/00* (2013.01)

(58) Field of Classification Search
CPC ........ G01F 11/28; G01F 13/00; B67D 7/0266
See application file for complete search history.

(56) References Cited

U.S. PATENT DOCUMENTS

| | | | |
|---|---|---|---|
| 4,591,442 A | * | 5/1986 | Andrews .............. B01D 15/165 210/198.2 |
| 6,186,745 B1 | | 2/2001 | Johnson |
| 7,044,404 B1 | | 5/2006 | Kricheldorf |

(Continued)

FOREIGN PATENT DOCUMENTS

| | | |
|---|---|---|
| EP | 2720103 A1 | 4/2014 |
| WO | 03025547 A1 | 3/2003 |

(Continued)

OTHER PUBLICATIONS

International Search Report and Written Opinion issued in connection with corresponding Application No. PCT/US2016/047372 dated Jan. 20, 2017.

(Continued)

*Primary Examiner* — Paul S Hyun (57) ABSTRACT

Fluid transport approaches are described that operate without the need for precise displacement of an actuator and with little or no sensing in the flow path. In certain implementations, a gas phase in a fluid reservoir is compressed by a pressure source such that releasing the pressure, such as by opening a valve to an intermediary conduit, displaces fluid to the intermediary chamber. Closing that fluid path and opening a different fluid path to a chamber at ambient temperature causes the fluid to be displaced to the chamber.

4 Claims, 7 Drawing Sheets

(56) References Cited

U.S. PATENT DOCUMENTS

| | | |
|---|---|---|
| 7,258,140 B2 | 8/2007 | Acree |
| 2003/0010792 A1 | 1/2003 | Forshey et al. |
| 2005/0175476 A1 | 8/2005 | Patterson |
| 2013/0108513 A1 | 5/2013 | Samper et al. |
| 2014/0099722 A1 | 4/2014 | Boudot et al. |
| 2014/0194851 A1* | 7/2014 | Burke ............... A61M 5/16881 604/506 |
| 2014/0350511 A1 | 11/2014 | Carlisle et al. |
| 2015/0093259 A1 | 4/2015 | Pepper |
| 2015/0182964 A1 | 7/2015 | Samper et al. |

FOREIGN PATENT DOCUMENTS

| | | |
|---|---|---|
| WO | 2013126685 A1 | 8/2013 |
| WO | 2014056880 A1 | 4/2014 |

OTHER PUBLICATIONS

Song, W.H., et al.; "Thermo-pneumatic, single-stroke micropump", Journal of Micromechanics and Microengineering, vol. 15, No. 8, Jun. 6, 2005.

Gorkin, III, Robert, et al.; "Pneumatic pumping in centrifugal microfluidic platforms", Microfluidics and Nanofluidics, vol. 9, Issue: 2, pp. 541-549, Aug. 2010.

Kong, Matthew C.R., et al.; "Pneumatic Flow Switching on Centrifugal Microfluidic Platforms in Motion", Analytical chemistry, 83 (3), pp. 1148-115, 2011.

* cited by examiner

GAS DRIVEN FLUID TRANSPORT

BACKGROUND

The subject matter disclosed herein relates generally to fluidic systems, including microfluidic and industrial-scale systems, and more particularly, to systems and methods for metering fluid, such as a reagent in such a system.

In various research, medical, industrial, and commercial contexts systems may be employed that rely on metering a fluid from one location to another, such as to facilitate a chemical or pharmacological reaction. For example, a fluid in the form of a liquid may need to be moved from one location to another in precisely measured increments or units or may need to be added to a reaction chamber in a precise dose and within a precise time frame. The scale of such operations may range from the microfluidic sale in a laboratory or research context to the industrial scale, such as in a manufacturing or production context.

In many cases fluid transport (in micro and macro dimensions) relies on mechanical pumping that moves the fluid by mechanical action. If the circumstances do not favor mechanical pumping it is possible to use hydraulic induced flow or gas pressure driven flow. However, hydraulic fluid transport typically requires a high level of design of the fluid flow path and is not suitable for handling micro dimensions where no gravitational force is present. While gas pressure driven flow is flexible and largely size independent, however a constraint on such gas driven approaches is that volumetric metering relies on sensing of the flow rate and/or timing accuracy of control valves of the flow.

BRIEF DESCRIPTION

In one implementation, a fluid transport system is provided. In accordance with this implementation, the fluid transport system includes: a pressure source; a reservoir pressure vessel having a first volume pressurized with a first fraction of a liquid and a gas, wherein the first fraction varies over time when the fluid transport system is in use; a metered pressure vessel having a second volume pressurized with a second fraction of the liquid and the gas, wherein the second fraction varies over time when the fluid transport system is in use; and an outlet. A first interruptible flow path connects the reservoir pressure vessel and the metered pressure vessel when open. A second interruptible flow path connects the metered pressure vessel and the outlet when open.

In a further implementation, a method is provided for transporting fluids. In accordance with this method, pressurized gas is injected into a reservoir pressure vessel. A first valve controlling access between the reservoir pressure vessel and a metered pressure vessel is opened such that a portion of fluid from the reservoir pressure vessel flows to the metered pressure vessel until pressure equilibrates between the reservoir pressure vessel and the metered pressure vessel or until a first target pressure is reached. The first valve is closed and a second valve controlling access to an outlet from the metered pressure vessel is opened such that the portion of fluid in the metered pressure vessel flows to the outlet until pressure equilibrates between the metered pressure vessel and a target or ambient pressure or until a second target pressure is reached. The steps of opening the first valve and second valve are repeated in alternation until a target volume of the fluid is dispensed through the outlet.

In an additional implementation, a chip-based fluid transport system is provided. In accordance with this implementation, the chip-based fluid transport system includes: a chip substrate comprising a fluid flow path having one or more of: an inlet connection or pressure generating chamber, a reservoir connection, and an outlet connection; a first valve controlling flow along the fluid flow path between the reservoir connection and the inlet connection or pressure generating chamber; a second valve controlling flow along the fluid flow path between the reservoir connection and an intermediary chamber; and a third valve controlling flow along the fluid flow path between the intermediary chamber and the outlet connection. In certain implementations, one or both of a reservoir connected via the reservoir connection and the intermediary chamber may be provided on a chip corresponding to the chip substrate or off the chip.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While the certain of the following examples are provided in the context of microfluidic systems, including systems used for radiopharmaceutical generation, it should be appreciated that the present techniques are not limited to such contexts. Indeed, the provision of examples and explanations in such a radiopharmaceutical context is only to facilitate explanation by providing instances of real-world implementations and applications. However, the present approaches may also be utilized in other contexts, such as industrial and manufacturing setting, laboratory and research settings, and so forth. By way of example, liquid volumes in the range of 10 μl to 2 ml (or more) may be transported in the described manner and may be metered with 2% to 5% accuracy without precision timing control of the valve operations described below.

Examples of suitable uses for the present technique include, but are not limited to, application in a radiopharmacy platform for synthesis of a positron emission tomography (PET) tracer and, more generally applications for in general "lab-on-a-chip" contexts, such as implementations handling microliters to hundreds of μl in channels and structures where surface effects dominate over mass effects (i.e., where Bond number $\ll 1$ & Weber number $\ll 1$). Two examples of suitable contexts include lab-on-a-chip implementations having with super-hydrophobic or hydrophilic surfaces. Similarly, the present approach may be suitable for use in the field of light liquid hydrocarbon pumping and metering systems for use in field analytical equipment, which may meter volumes in the range of 1 ml-hundreds of ml, and may be suitable for use in applications having low energy requirements and ATEX 1 or similar explosion risk. In such applications, the disclosed approach may be scaled up to instead be used to meter volumes in the range of liters to thousands of liters. Other applications may include use in direct energy conversion and/or heat and energy harvesting. In yet other applications the present approach may be suitable for use in the food or pharmaceutical industries to avoid needing to sanitize machinery that meters volumes using positive displacement pumps (i.e., no positive displacement pumps are needed). Further, the present approach may be suitable for uses involving moving samples of a multi-phase composition (e.g., liquid-solid or liquid gas), such as blood or mud, or a liquid-liquid composition.

With the preceding in mind, the present approach relates to a fluid transport approach that does not utilize mechanical pumping to pump a fluid (e.g., liquid) from one location to another. In addition, this approach allows accurate metering of a fluid without flow rate sensing, though in some implementations pressure sensing may be employed. Thus, the fluid may, in certain implementations, be metered without time dependent control, instead relying on monitoring of pressure in one or both of the reservoir pressure vessel or metered pressure vessel. Alternatively, if pressures are allowed to equilibrate as part of the metering operation (e.g., between valve actuation events), neither valve timing nor pressure monitoring may be employed since the pressures in each vessel, and the amount of fluid displaced, are known after pressure equilibration. In one implementation, accurate metering of the fluid is accomplished by decoupling of a reservoir pressure vessel and an outlet by use of an intervening metered pressure vessel (i.e., an intermediary pneumatic spring chamber) disposed in the path between the reservoir pressure vessel and outlet.

By way of example, a fluid transport system in accordance with this approach may include four different functional blocks or components: a pressure source, a reservoir pressure vessel, a metered pressure vessel, and an outlet, some of which are connected by interruptible flow paths, such as paths employing valves that may be actuated between open and closed positions. In one such implementation, the reservoir pressure vessel has a known initial fill factor of a liquid to be metered out of the outlet. Both the reservoir pressure vessel and the metered pressure vessel have known volumes. In operation, these pressure vessels are pressurized at different times with different fractions of the liquid to be metered and a gas. In practice, the initial and dynamic pressures in each of the pressure vessels is known and the pressures associated with both the pressure source and outlet are also known.

For example, as discussed in greater detail below, a partly liquid filled reservoir (i.e., reservoir pressure vessel) may be pressurized with a gas, either via a single discrete (e.g., initial) pressurization step or in a continuously controlled manner, such as via a dedicated or separate pressurization line. The pressurized gas within the reservoir displaces liquid out of the reservoir and into a metered pressure vessel (i.e., an intermediary chamber or pneumatic spring) until a target or equilibrium pressure is established between the reservoir and intermediary chamber. In one implementation, by closing the inflow path to the intermediary chamber and opening the outflow path from the intermediary chamber to a region at reduced or ambient pressure, a metered amount of liquid is transported from the intermediary chamber through the outlet. In this manner, a low-complexity (potentially cheap or disposable) platform can be manufactured for accomplishing fluid transport that may also be a closed system, such as to prevent contamination.

Figure 1:
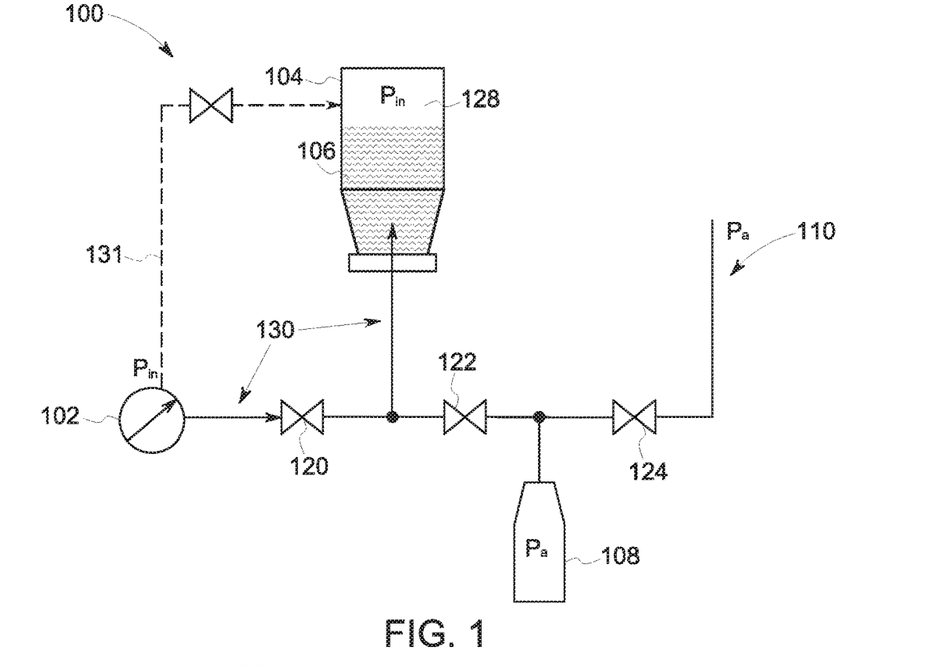
FIG. 1 schematically depicts a fluid transport system at a first step of a fluid transport, in accordance with aspects of the present disclosure.
Figure 2:
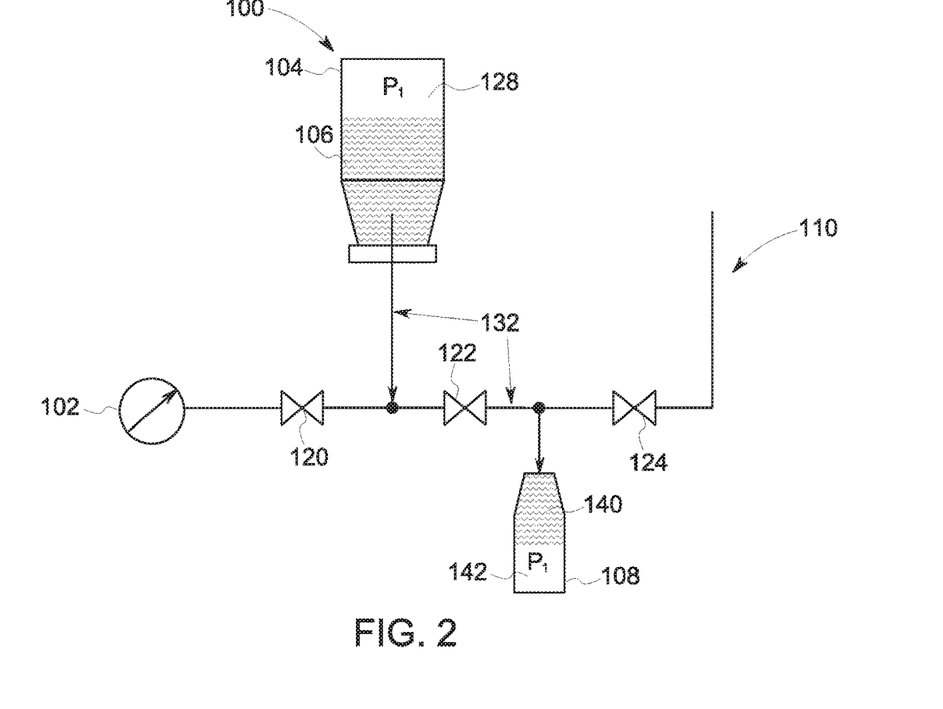
FIG. 2 schematically depicts a fluid transport system at a second step of a fluid transport, in accordance with aspects of the present disclosure.
Figure 3:
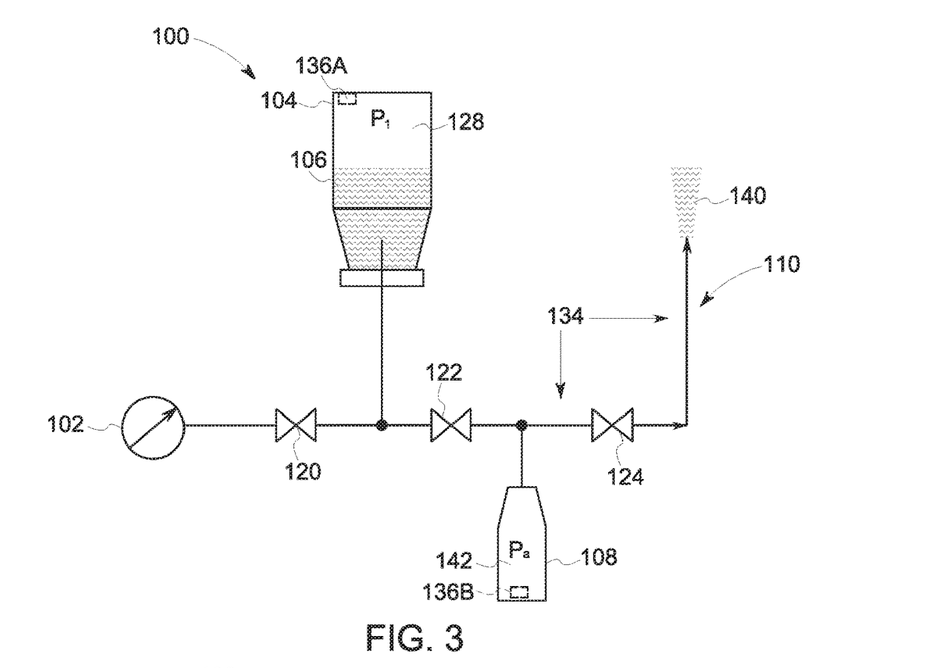
FIG. 3 schematically depicts a fluid transport system at a third step of a fluid transport, in accordance with aspects of the present disclosure.

By way of example, FIGS. 1-3 depict a schematic example of a fluid transport system 100 in accordance with one present approach. The system 100 described with respect to FIGS. 1-3 may operate at the microfluidic or macrofluidic level, including at industrial scale of production. The depicted system 100 includes an air pressure source 102 (or other gas pressure source) which is configured to inject or otherwise apply a pressurized gas into the closed system 100. Gas pressure may be applied, such as to reservoir pressure vessel 104, either at discrete intervals (such as via path 130, a shared portion of which is employed for gas in-flow at a pressurization step and fluid out-flow at fluid flow step) or in a continuous manner (such as via alternative path 132 (shown by dotted line) constituting a dedicated and separate gas line through which gas pressure from source 102 can be applied in a continuous or as needed manner to the vessel 104). As discussed below, the pressure source 102 may be external to the system 100 or internal or intrinsic to the system 100, such as an internal mechanism that generates pressure by direct heating of gas, movement of a membrane, chemical or electrochemical reactions, and so forth.

The reservoir pressure vessel 104 (e.g., a fluid reservoir, such as a vial or other fluid chamber) is initially completely or partly filled with a fluid 106 (e.g., a liquid) to be output in a metered or otherwise controlled manner, such as to a reaction or mixing chamber. In certain implementations the fluid 106 is a liquid having non-linear & hysteretic behavior. The fill factor of the reservoir pressure vessel 104 is initially known. A metered pressure vessel 108 (i.e., pneumatic spring or intermediary chamber) is provided between the reservoir pressure vessel 104 and the fluid outlet 110. The reservoir pressure vessel 104 and metered pressure vessel 108 are each of known volume and, as discussed herein, at different times during operation are each pressurized with different fractions of liquid and gas (i.e., the respective fraction in each pressure vessel changes over time during operation). Further, though a single reservoir pressure vessel 104 and metered pressure vessel 108 are shown for simplicity in the referenced figures, in practice more than one of either or both of these vessels may be provided and may be arranged in a serial or parallel configuration in such a context.

With this in mind, the pressures associated with the pressure source 102 and outlet 110 are known and, likewise, the initial and dynamic pressures in each of the pressure vessels 104, 108 are known in accordance with the present approach. As described herein, each of the pressure source 102, reservoir pressure vessel 104, metered pressure vessel 108, and outlet 110 perform different functions and may be considered separate and distinct functional blocks.

The geometry (shape, dimensions, and so forth) of the intermediary chamber (i.e., pneumatic spring) 108 and/or the connecting tubing of the fluid flow path may be configured or selected so as to support a clear separation of the liquid and gas phase based upon the properties (e.g., surface tension) of the fluid 106 being transported. For example, for macrofluidic implementations dimensions and/or geometry for one or both of the tubing and metered pressure vessel 108 may be selected that are suitable for the influence of gravitational forces. Conversely, for microfluidic implementations dimensions and/or geometry for one or both of the tubing and metered pressure vessel 108 may be selected that are suitable for the influence of capillary forces. By way of example, in one embodiment the metered pressure vessel 108 has geometrical dimensions that support microfluidic characteristics (surface to volume ratio, dominate surface energy of liquid, incompressibility of liquid, no buoyancy effect in fluid flow path, and so forth).

In the depicted example, at least two interruptible flow paths are provided, such as one interruptible flow path between the reservoir pressure vessel 104 and metered pressure vessel 108 and one interruptible flow path between the metered pressure vessel 108 and outlet 110. Additional interruptible flow paths, such as between the pressure source 102 and reservoir pressure vessel 104 and/or between the pressure source 102 (or a separate pressure source) and the metered pressure vessel 108, may also be provided, such as in parallel, such that more than one channel may exist for movement of the pressurized gas and/or metered liquid.

By way of example, in the referenced figures three valves are positioned along the flow path between the above noted components: a first valve 120 between the pressure source 102 and reservoir pressure vessel 104, a second valve 122 between the reservoir pressure vessel 104 and metered pressure vessel 108, and a third valve 124 between the metered pressure vessel 108 and outlet 110. In certain implementations, some or all of the first, second, and third valves 120, 122, 124 are directional valves or directional control valves that can be actuated between at least a working and normal (or rest) position (e.g., a 2/2 valve having two ports and two positions). In addition, FIG. 1 depicts an alternative arrangement in which a separate pressure line 131 connects the pressure source 102 and reservoir pressure vessel 104 without sharing any of the fluid path through which fluid 106 flows, thus allowing pressure line 131 to be used in a continuous, as opposed to discrete, manner without interfering with fluid flow. Examples of suitable valves include, but are not limited to: freeze valves, pinch valves, pressure barrier valves, rotary valves, bubble valves, electrostatic valves, or piezoelectric valves.

As noted above, the referenced figures are depicted as showing a shared flow path segment through which pressurized gas from pressure source 102 and liquid from reservoir pressure vessel 104 flow, which may be suitable for implementations in which the reservoir pressure vessel 104 is pressurized once (i.e., initially) during a metering operation. However, in other implementations gas may be provided to the reservoir pressure vessel 104 by a separate line (i.e., the separate pressure line 131) so that the pressure in the reservoir pressure vessel 104 may be controlled continuously (or charged multiple times), as opposed to a single discrete initial pressurization event.

With the preceding structure in mind, FIG. 1 depicts a first step in an example of a metering operation by which a measured dose or quantity of fluid 106 is output via outlet 110 to a reaction or chamber. In this step, second valve 122 is closed while first valve 120 is open or, alternatively, pressure is introduced via pressure line 131. The reservoir pressure vessel 104 is filled with a defined or known liquid or liquid and gas volume, which will remain known during operation due to the liquid 106 being metered out in known increments. In the depicted example, the reservoir pressure vessel 104 and inlet into the reservoir pressure vessel 104 are oriented (e.g., upright) so that the liquid 106 surrounds or covers the inlet during operation, such as due to gravitational forces. At this stage of the operation, the metered pressure vessel 108 and outlet 110 are filled with gas at ambient pressure ($p_a$).

At the operation step shown in FIG. 1, the gas pressure source 102 is activated so as to generate an inlet or initial reservoir pressure ($p_{in}$) greater than ambient pressure, $p_a$. Due to the first valve 120 being open and second valve 122 being closed, the pressurized gas flows through open fluid path (shown as segments 130 with flow path arrows) from the pressure source 102, through the first valve 120, and into the reservoir pressure vessel 104, which compresses the gas volume 128 in the reservoir pressure vessel 104 to the inlet pressure, $p_{in}$. As noted above, in other implementations, the pressurized gas may instead be provided from the pressure source 102 to the reservoir pressure vessel 104 by a separate, dedicated pressure line 131. In such implementations, the gas pressure in the reservoir pressure vessel 104 may be held constant by the pressure source, though in other implementations as discussed herein the gas pressure in the reservoir pressure vessel 104 may decrease as the gas volume in the pressure vessel increases.

Turning back to the figures, in the depicted implementation, to prevent fractional flow (i.e., both gas and liquid flow in some proportion) when only one tubing into the reservoir pressure vessel 104 is available, the reservoir pressure vessel 104 is pressurized only once for a given fluid (i.e., liquid) transfer operation and the fluid path to the gas pressure source 102 is closed after the initial pressurization event. Thus, in such an example once the reservoir pressure vessel 104 is pressurized at $p_{in}$, first valve 120 is closed. Furthermore, the pressurized gas employed may be relevant to the operational parameters. For example, a gas like $CO_2$ with a high solubility creates more gas plugs in the downstream fluid path (due to decreasing pressure) than $N_2$ with a low solubility.

In this example, turning to FIG. 2, after the first valve 120 is closed, the second valve 122 is opened. The third valve 124 remains closed (or is closed) before opening the second valve 122. Once the second valve 122 is opened, the gas volume 128 in the reservoir pressure vessel 104 can decompress by displacing fluid 106 (e.g., a liquid being metered out) through the open fluid flow path (segments 132 with flow path arrows) into the metered pressure vessel 108 (i.e., the pneumatic spring) such that the metered pressure vessel 108 contains a displaced volume 140 of the fluid 106. The gas volume 142 in the metered pressure vessel 108 is trapped and compressed by the displaced fluid 140 until the gas volume 128 of the reservoir pressure vessel 104 and the gas volume 142 of the metered pressure vessel 108 reach an equilibrium state at the same pressure, $p_1$, that is less than the inlet pressure, $p_{in}$. As discussed in greater detail below, this interconnection can be calculated by the initial quantity n of gas molecules in the reservoir pressure vessel 104 and metered pressure vessel 108 and based upon the assumption of isothermal decompression/compression. This relationship can also be used to define the amount of liquid (i.e., volume 140) inside the metered pressure vessel 108. Hence, this step of liquid transport base upon liquid transport between chambers is also a metering step. As may be appreciated, this metering may be performed without using a metering or flow sensor. When the equilibrium state at $p_1$ is reached the second valve 122 is closed.

As will be appreciated, the equilibrium pressure $p_1$ is greater than ambient pressure, $p_a$. Thus, turning to FIG. 3, when second valve 122 is closed and the third valve 124 is opened, the gas volume 142 in the metered pressure vessel 108 (i.e., pneumatic spring) decompresses, forcing the volume 140 of fluid 106 through the open fluid path (segments 134 with flow path arrows) and out of the outlet 110. The decompression occurs until the gas pressure equilibrates between the metered pressure vessel 108 and the outlet chamber, presumably at ambient pressure, $p_a$. As shown, decompression of the gas 142 in the metered pressure vessel 108 propels the dose or quantity 140 of the fluid 106 out of the outlet line 110, such as into a reaction or mixing chamber.

After one iteration of closing the second valve 122 and opening the third valve 124, the gas pressure in the reservoir pressure vessel 104 remains at $p_1$, which is still greater than ambient pressure $p_a$. With this in mind, in certain implementations, after ambient pressure is restored in the metered pressure vessel 108 the third valve 124 may be closed again and the second valve 122 re-opened, restoring a fluid flow path between the reservoir pressure vessel 104 and metered pressure vessel 108. The gas volume 128 in the reservoir at $p_1$ can again decompress relative to the intermediary chamber at ambient pressure $p_a$, thereby pushing more fluid 106 into the metered pressure vessel 108 until a new equilibrium pressure $p_2$ (which is less than $p_1$ but more than $p_a$) is reached in both the reservoir pressure vessel 104 and metered pressure vessel 108. In this example, second valve 122 can again be closed and third valve 124 opened to expel the fluid 106 now in the metered pressure vessel 108 and this process of alternately opening and closing the second valve 122 and third valve 124 can be repeated a set number of times, until either an ambient pressure or a target pressure (such as a pressure associates with the transport of a target volume of fluid 106) is reached in the reservoir pressure vessel 104, or until a target volume or mass of the fluid 106 is metered out of the outlet 110.

In this manner, the coupled decreasing pressure in the reservoir pressure vessel 104 and metered pressure vessel 108 from step to step (and therewith the decreasing pumping volume 140 of liquid 106) follows the same behavior like the simple decompression of a chamber connected to an outlet but in discrete steps. It may be appreciated from this description that, for every initial priming of the reservoir with pressurized gas from the pressure source 102, a series of iterations or cycles of fluid 106 release may be accomplished by alternating opening of the second valve 122 and third valve 124, with each iteration transporting less of fluid 106 as the initial pressure $p_{in}$ within the reservoir is gradually reduced ($p_1$, $p_2$, and so forth) to ambient pressure $p_a$ or some other target pressure. With knowledge of the used liquid, the pre-setting of the gas volume, the initial pressure and a temperature measurement it is possible to calculate the dispensed volume. As discussed in greater detail below, to account for the decreasing volume of fluid 106 release with each alternating iteration of second and third valve 122, 124 opening (for a single pressurization event), a formula may be employed that takes into account the influencing boundary conditions associated with each iteration.

The preceding relates an implementation where pressure equilibration is employed to control for and meter fluid flow. In such an approach, precise metering may be obtained without precise timing of the valve operations, without the use of flow rate sensors, and without the use of pressure sensors. However, in other implementations, it may be useful to use pressure sensors 136 (shown by way of example in FIG. 3) to measure pressure in one or both of the reservoir pressure vessel 103 and/or metered pressure vessel 108 and to control operation of one or more of the valves 120, 122, 124 based upon the measured pressure(s). While such implementations may add some degree of complexity in terms of utilizing pressure sensors 136, they may also offer certain advantages, such as the flexibility to control metering of the fluid 106 based on pressures other than equilibrium pressure.

Figure 4:
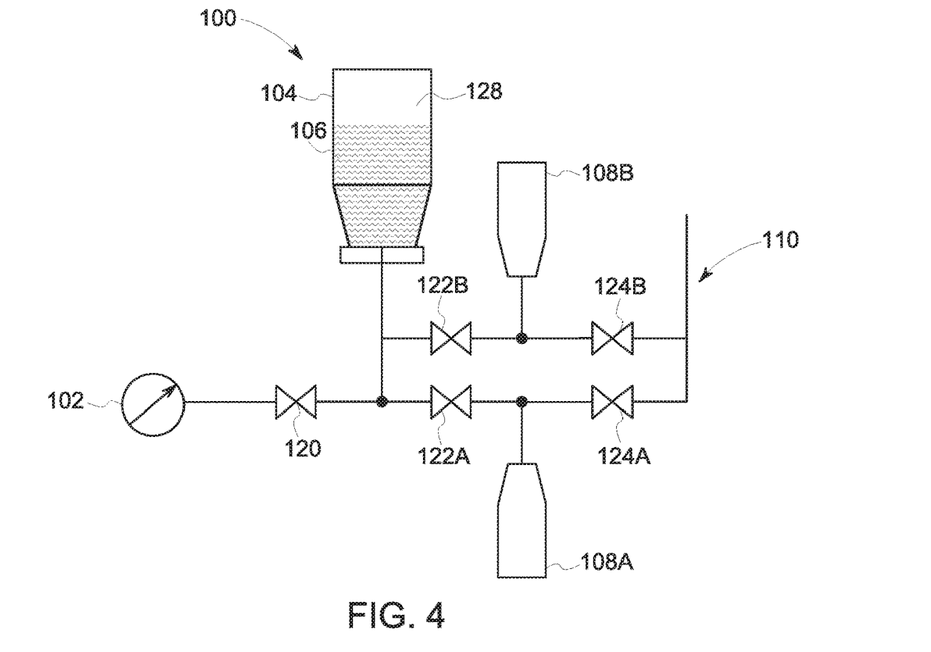
FIG. 4 depicts an alternative implementation of the fluid transport system of FIGS. 1-3 having a parallel fluid flow path, in accordance with aspects of the present disclosure.

While the preceding describes a single fluid flow path, it may be appreciated that multiple fluid flow paths may be provided downstream of the reservoir pressure vessel 104 so as to allow, in alternating operation, a more continuous discharge of fluid 106 from outlet 110. By way of example, FIG. 4 depicts a pair of parallel flow paths (i.e., A and B) paths between the reservoir pressure vessel 104 and outlet 110. In such an implementation, the separate, parallel flow paths may be operated in an alternating fashion until the reservoir pressure vessel 104 is at ambient pressure or the desired dose or quantity of fluid 106 is output.

Figure 5:
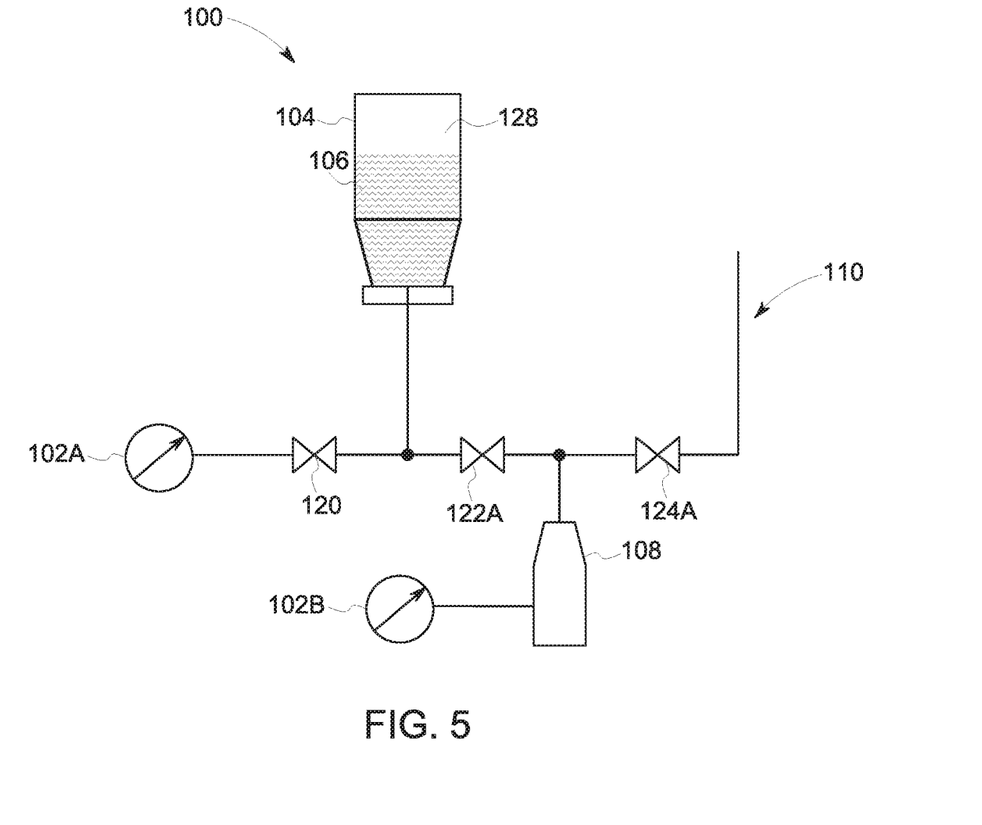
FIG. 5 depicts an alternative implementation of the fluid transport system of FIGS. 1-3 having a second pressure source, in accordance with aspects of the present disclosure.

In addition, turning to FIG. 5, in certain embodiments either the pressure source 102 or a second gas pressure source 102B (shown) may be connected to the metered pressure vessel 108. In such an implementation, pressure from the pressure source 102, 102B may be applied to facilitate discharge of the fluid 106 from the metered pressure vessel 108. Such applied pressure may be in addition to or in place of the flow mechanisms discussed herein and/or may be used as a purge mechanism at the end of a metering operation.

Figure 6:
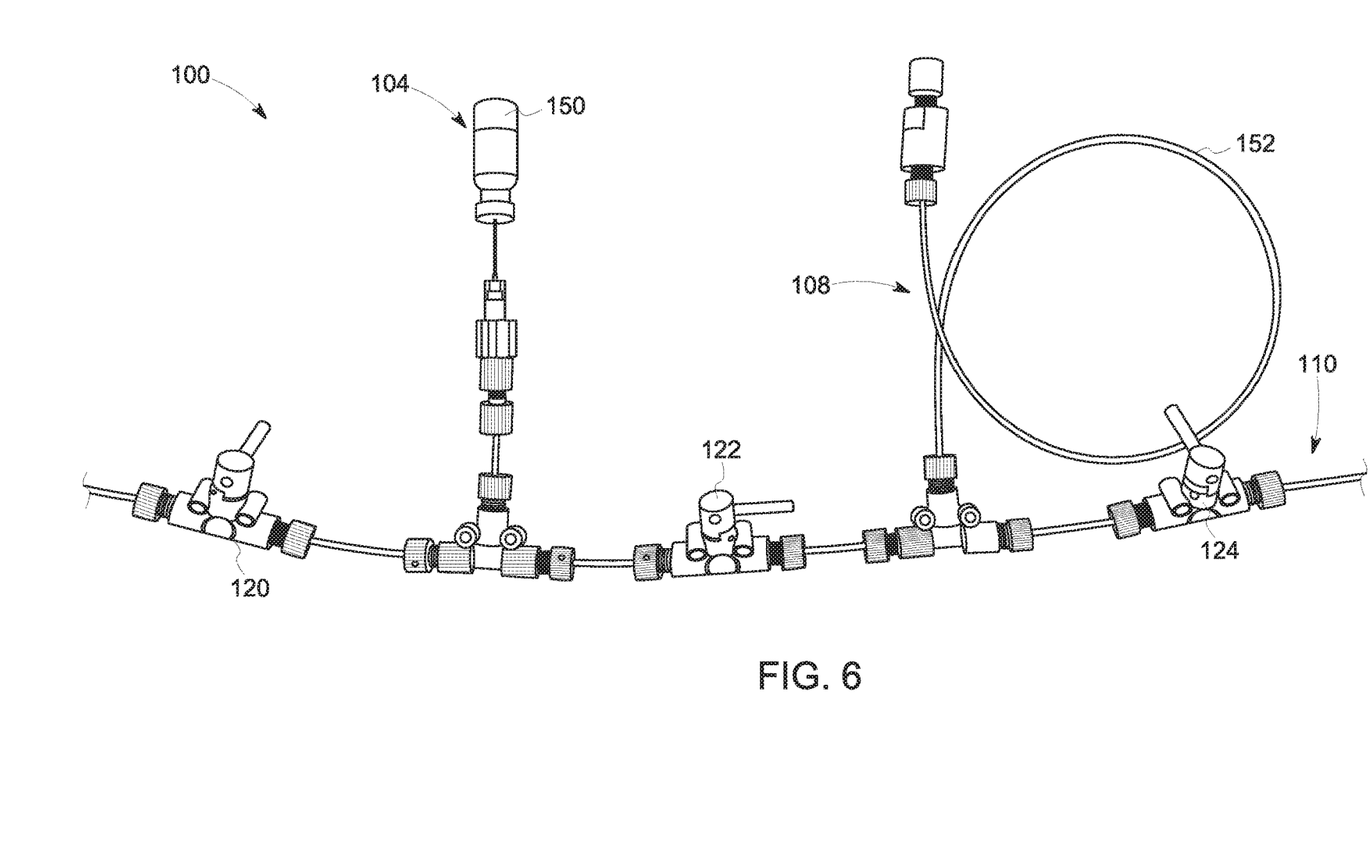
FIG. 6 depicts an experimental setup of a fluid transport system, in accordance with aspects of the present disclosure.

With the preceding in mind, FIG. 6 depicts an example of an experimental setup constructed to demonstrate feasibility. In this experimental setup, a vial was employed as the reservoir pressure vessel 104 with a needle inserted into the vial to establish fluid communication with the remainder of the setup. A length of tubing 152 was employed as the metered pressure vessel 108 (i.e., pneumatic spring). Manually operated valves and tubing were used to connect the pressure source, vial 150, tubing 152, and outlet.

Figure 7:
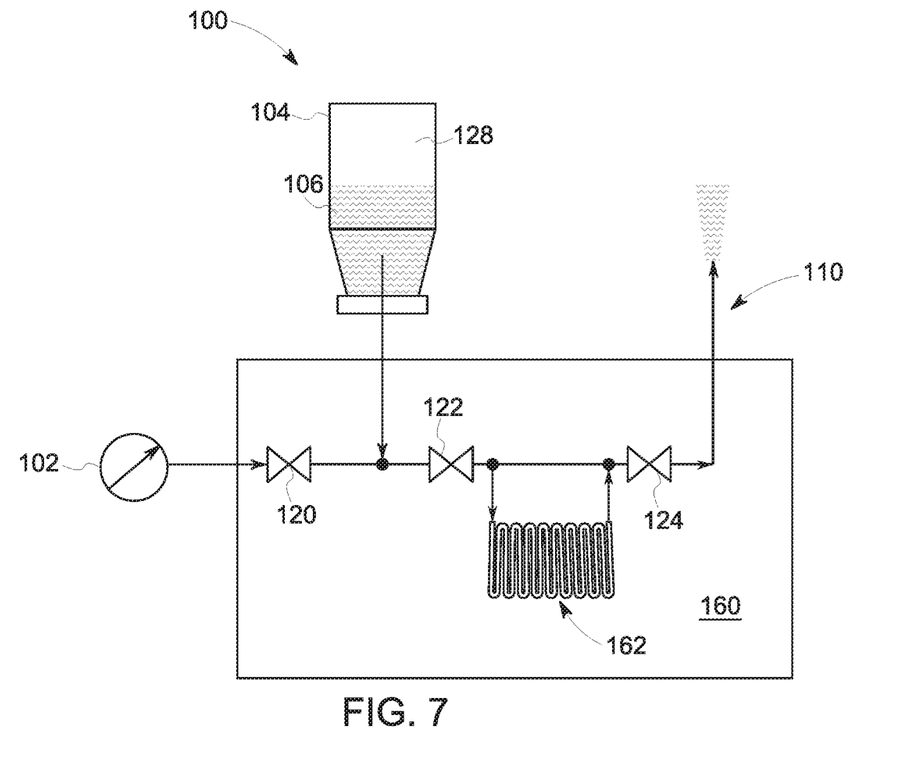
FIG. 7 depicts an alternative implementation of the fluid transport system of FIGS. 1-3 having a meander-geometry metered pressure vessel (e.g., pneumatic spring) and being fabricated on a chip, in accordance with aspects of the present disclosure.

Turning to FIG. 7, in one implementation the present approach may be fabricated as a compact lab-on-a-chip or other disposable medium construct. In the depicted example, the disposable and/or replaceable chip 160 provides ports or other connection interfaces for connecting to one or more of an external pressure source 102, external reservoir pressure vessel 104, and/or external reaction or mixing chamber via outlet 110. Alternatively, in some embodiments pressure generation mechanisms may be provided as part of the chip 160 itself, such as pre-stored pressure provides within a fabricated chamber of the chip 160 and/or pressure generation provided by heating a chamber or portion of the chip 160, a chemical reaction performed on the chip 160, a polymer swell reaction performed on the chip 160, and so forth.

Further, in such an on-chip implementation the metered pressure vessel 108 may be provided as a closed chamber as shown or, alternatively, as a serpentine- or meander-geometry closed path 162. By way of example, in one implementation of an on-chip setup, the reservoir chamber 104 connected to the chip 160 may be a vial having an initial gas volume (e.g., 900 μl) and the pneumatic spring 108 may be a meander-geometry path having an initial gas volume of 100 μl.

Figure 8:
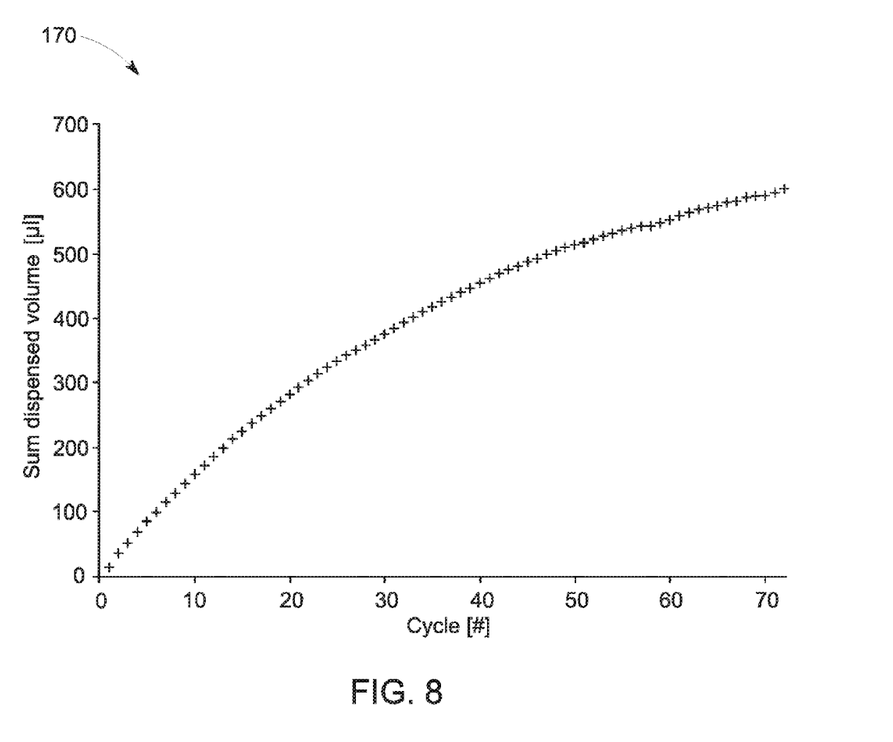
FIG. 8 is a graph depicting aggregate dispensed volume versus number of cycles of the fluid transport system, in accordance with aspects of the present disclosure.

While the preceding relates various structural aspects of different implementations, the following discussion relates both two analytic and experimental results as well as to analytic formulations related to performance of fluid transport in accordance with the present approach. Turning to FIG. 8, a graph 170 is shown which depicts the sum of a dispensed volume of fluid 106 in μl (y-axis) against the number of cycles of the fluid transfer mechanism (e.g., each cycle corresponding to a cycle of alternately opening the second valve 122 and third valve 124). In this example, the metered pressure vessel 108 was tubing with a 30 μl initial gas volume 142. The reservoir chamber 104 was a vial 150 filled with H$_2$O and having an initial gas volume 128 of 500 μl. The vial 150 was initially pressurized (by a pressure source 102) with 2 bar of N$_2$ gas. As shown in the graph 170, the volume of the dispensed fluid 106 tapers as the pressure equilibrates between the pressurize reservoir pressure vessel 104 and ambient pressure.

With this in mind, the dispensed volume sum of fluid 106 may be represented by the analytical formula:

$$V_d(i) = \sum_{x=1}^{i} \left(1 - \frac{n_S}{n_R}\right)^{x-1} * \left(V_S - \frac{n_S}{n_R} V_R\right) \quad (1)$$

where n is the amount of substance (moles), p is pressure, V is volume, S is an index corresponding to the pneumatic spring (i.e., metered pressure vessel 108), R is an index corresponding to the reservoir pressure vessel 104, and d is an index corresponding to the volume of fluid dispensed from outlet 110. Further:

$$\frac{n_S}{n_R} = \frac{p_S V_S T_R}{p_R V_R T_S} \quad (2)$$

where T is temperature.

Figure 9:
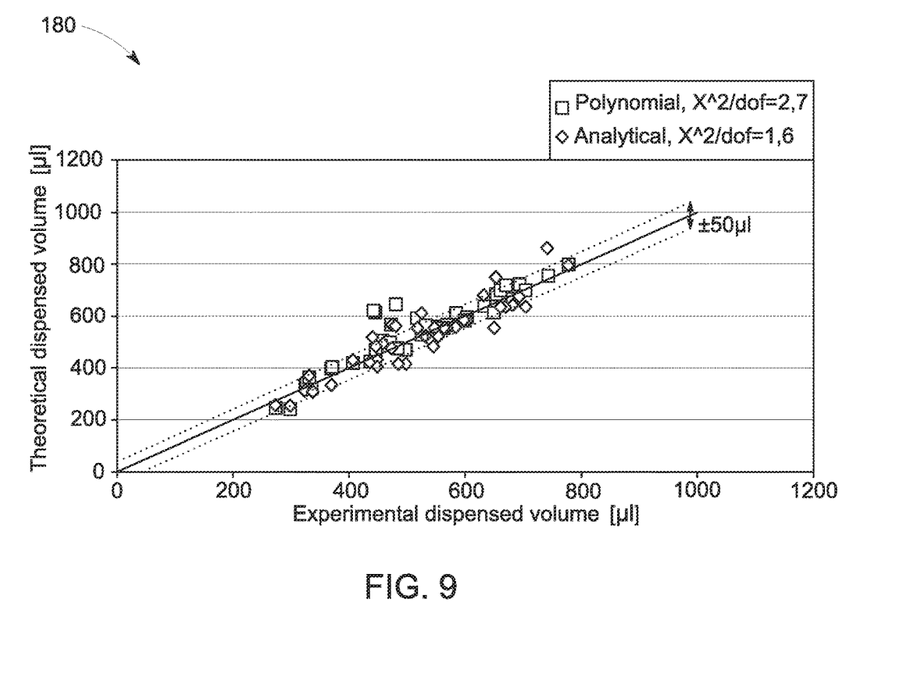
FIG. 9 is a graph depicting theoretical versus actual dispensed volume using a fluid transport system in accordance with aspects of the present disclosure.

With this in mind, FIG. 9 depicts a graph 180 plotting the analytically derived (i.e., theoretical) dispensed volume (y-axis) versus the experimentally measured dispensed volume (x-axis). In this plot, the data points denoted "polynomial" correspond to a regression curve or fitting of the experimental data. The data points denoted "analytical" correspond to the values calculated using equations (1) and (2) using a constant offset of 131 μl. It may be noted that in the plotted data at 450 μl on the x-axis, measurement errors were present in the experimental data, thus reducing the fit.

In general however, absent these measurement errors, the theoretical and measured data fits closely within a ±50 μl band about the fit line.

These results are consistent with other fluid transport results obtained using the present approach and shown in Table 1. In these results, to determine the accuracy of the final dispensed volume with a chip setup different liquids were tested. The accuracy's are shown in Table 1 for volumes of interest. Subsequent experiments with all boundary conditions shown an accuracy within 2% to 5% of the actual value.

TABLE 1

| Liquid | Volume (μl) | Standard Deviation (±μl) |
| --- | --- | --- |
| Water | 1,531.8 | 49.2 |
|  | 297.3 | 2.5 |
| Ethanol | 1,512.0 | 68.8 |
|  | 100.9 | 4.1 |
| Acetonitrile | 520.4 | 10.4 |
|  | 101.2 | 6.8 |

Technical effects of the invention include fluid transport without the need for precise displacement of an actuator and with little or no sensing in the flow path. In certain implementations, a gas phase in a fluid reservoir is compressed by a pressure source such that releasing the pressure, such as by opening a valve to an intermediary conduit, displaces fluid to the intermediary chamber. Closing that fluid path and opening a different fluid path to a chamber at ambient temperature causes the fluid to be displaced to the chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A fluid transport system comprising:
a gas pressure source;
a reservoir pressure vessel having a first volume with a first fraction of a liquid and a gas disposed therein and pressurized by the gas pressure source;
a first valve disposed in a first interruptible flow path connecting fluidly the gas pressure source and the reservoir pressure vessel to selectively control a flow of the gas between the gas pressure source and the reservoir pressure vessel;
a metered pressure vessel having a second volume with a second fraction of the liquid and the gas disposed therein and pressurized by the reservoir pressure vessel;
an outlet;
a second interruptible flow path connecting fluidly the reservoir pressure vessel and the metered pressure vessel providing liquid from the reservoir pressure vessel to the metered pressure vessel;
a third interruptible flow path connecting fluidly the metered pressure vessel and the outlet providing a metered liquid flow from the metered pressure vessel to the outlet;

a second metered pressure vessel having a third volume pressurized by the reservoir pressure vessel with a third fraction of the liquid and the gas provided by the reservoir pressure vessel; and a fourth interruptible flow path connecting fluidly the reservoir pressure vessel and the second metered pressure vessel; and a fifth interruptible flow path connecting fluidly the second metered pressure vessel and the outlet.

2. A fluid transport system comprising:

a gas pressure source;

a reservoir pressure vessel having a first volume with a first fraction of a liquid and a gas disposed therein and pressurized by the gas pressure source;

a first valve disposed in a first interruptible flow path connecting fluidly the gas pressure source and the reservoir pressure vessel to selectively control a flow of the gas between the gas pressure source and the reservoir pressure vessel;

a metered pressure vessel having a second volume with a second fraction of the liquid and the gas disposed therein and pressurized by the reservoir pressure vessel;

an outlet;

a second interruptible flow path connecting fluidly the reservoir pressure vessel and the metered pressure vessel providing liquid from the reservoir pressure vessel to the metered pressure vessel;

a third interruptible flow path connecting fluidly the metered pressure vessel and the outlet providing a metered liquid flow from the metered pressure vessel to the outlet;

a first pressure sensor to monitor the pressure of the reservoir pressure vessel; and a second pressure sensor to monitor the pressure of the metered pressure vessel.

3. A fluid transport system comprising:

a gas pressure source;

a reservoir pressure vessel having a first volume with a first fraction of a liquid and a gas disposed therein and pressurized by the gas pressure source;

a first valve disposed in a first interruptible flow path connecting fluidly the gas pressure source and the reservoir pressure vessel to selectively control a flow of the gas between the gas pressure source and the reservoir pressure vessel;

a metered pressure vessel having a second volume with a second fraction of the liquid and the gas disposed therein and pressurized by the reservoir pressure vessel, wherein the metered pressure vessel comprises a pneumatic spring;

an outlet;

a second interruptible flow path connecting fluidly the reservoir pressure vessel and the metered pressure vessel providing liquid from the reservoir pressure vessel to the metered pressure vessel; and a third interruptible flow path connecting fluidly the metered pressure vessel and the outlet providing a metered liquid flow from the metered pressure vessel to the outlet.

4. A fluid transport system comprising:

a gas pressure source;

a reservoir pressure vessel having a first volume with a first fraction of a liquid and a gas disposed therein and pressurized by the gas pressure source;

a first valve disposed in a first interruptible flow path connecting fluidly the gas pressure source and the reservoir pressure vessel to selectively control a flow of the gas between the gas pressure source and the reservoir pressure vessel;

a metered pressure vessel having a second volume with a second fraction of the liquid and the gas disposed therein and pressurized by the reservoir pressure vessel;

an outlet;

a second interruptible flow path connecting fluidly the reservoir pressure vessel and the metered pressure vessel providing liquid from the reservoir pressure vessel to the metered pressure vessel;

a third interruptible flow path connecting fluidly the metered pressure vessel and the outlet providing a metered liquid flow from the metered pressure vessel to the outlet;

wherein the metered pressure vessel is configured to support a clear separation of the liquid and the gas disposed therein; and wherein the metered pressure vessel is configured to be suitable for the influence of capillary forces.

\* \* \* \* \*